THOMAS L. REED.
Improvement in Water Proof Hose.
No. 124,914.          Patented March 26, 1872.
Fig 1.
Fig 2.
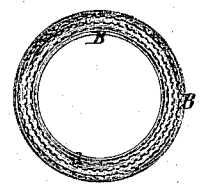
Fig 3.
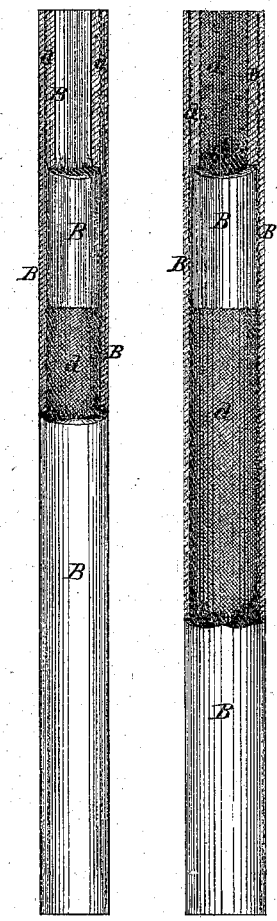
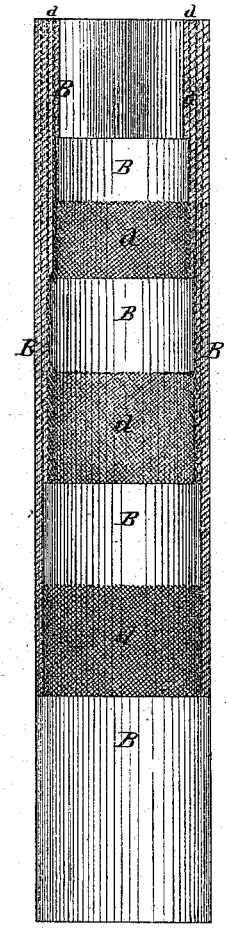
Witnesses.          Inventor.
Isaac A. Brunell,          Thomas L. Reed
David Heaton.

UNITED STATES PATENT OFFICE.

THOMAS L. REED, OF PROVIDENCE, RHODE ISLAND.

IMPROVEMENT IN WATER-PROOF HOSE.

Specification forming part of Letters Patent No. 124,914, dated March 26, 1872.

SPECIFICATION.

I, THOMAS L. REED, of the city and county of Providence and State of Rhode Island, have invented a new and Improved Water-Proof Hose for Hydrants and other purposes, of which the following is a specification, referring by letters to the accompanying drawing making part of the same, in which—

Figure 1 is an end view and a section of a certain construction of my improved hose. Fig. 2 is a like view of another combination or construction of the same; and Fig. 3 is a like view of still another construction.

Similar letters indicate like parts in all the figures.

My said invention consists of a tube or hose composed or made up of alternate sheaths or plies of vulcanized India rubber or other elastic and flexible material, and of fibrous material plaited or braided thereon, as hereinafter more fully described—that is to say, the first or inner layer or sheath may be either of India-rubber compound unvulcanized or of tubular braid-work of cotton, hemp, or other fibrous material, as may be desired, for the lining of the hose; and over this sheath is a second layer of braid-work, (if the first be of the vulcanizable compound,) and so on to the number of plies or thickness required for the hose, according to its size and purpose for which it is designed; after which the hose is rolled to harden it, and is then vulcanized by heat in the usual way.

By the best methods hitherto practiced of making tubes of alternate layers or sheaths of India rubber and like material, and of fibrous material, a woven tube or hose was coated inside with India-rubber cement, and then an unvulcanized tube drawn into it, and afterward the two layers united by rolling and vulcanizing; but, although this is possible with a woven tube of some thickness to give it the character of a hollow cylinder or tube, it has been hitherto found impossible to so treat a braided tube or hose wherein the yarns or threads are laid or plaited diagonally with its length, or to so braid and plait a braided sheath upon an inner sheath of India rubber or other like compound, except in short pieces, because of the difficulties attending the operation, and growing out of the necessities of a suitable core of considerable length, and of passing said core with the India rubber or like sheath upon it through a braiding-machine to receive the braided sheath, and of removing the core and leaving a smooth interior surface after the process of vulcanizing is performed; which difficulties being overcome by a practicable method, a more flexible tube, of equal or greater strength, is produced, and at less expense than the best compound India rubber and woven tube now in the market.

Such a compound tube or hose, consisting of alternate sheaths of India rubber and braid-work, may be produced by coating a stiff or flexible arbor or core with a resinous compound to receive the first layer or sheath—say, of India-rubber compound, B, Figs. 1 and 3—and over this plaiting or braiding a fibrous layer or sheath, $d$; and over this a second layer or sheath of India-rubber compound, B, and so on to the number of plies required; and finally to secure the whole at the ends to prevent the solvent resinous compound on the core from escaping, and afterward rolling and vulcanizing the whole; and, while yet in a heated condition from the vulcanizing process, open the tube at one end and draw out the core, which, by means of the solvent compound of resin on its surface, is separated from the inner surface of the tube and removed, leaving the inner surface of the tube perfectly smooth and the whole tube complete and perfect throughout its entire length.

Having described my said invention and the mode of carrying the same into effect, I claim—

The improved water-proof hose, composed of alternate sheaths or layers of India-rubber, gutta-percha, and other flexible and vulcanizable gum and fibrous material plaited or braided thereon, substantially in the manner described, as a new article of manufacture.

THOMAS L. REED.

Witnesses:
ISAAC A. BROWNELL,
DAVID HEATON.